United States Patent
Rapelje

(10) Patent No.: US 9,345,237 B2
(45) Date of Patent: May 24, 2016

(54) QUICK-DISCONNECT SOFT BAIT FISHING LURE

(76) Inventor: Donald Rapelje, Sequim, WA (US)

( * ) Notice: Subject to any disclaimer, the term of this patent is extended or adjusted under 35 U.S.C. 154(b) by 1690 days.

(21) Appl. No.: 11/379,762

(22) Filed: Apr. 21, 2006

(65) Prior Publication Data

US 2006/0236588 A1  Oct. 26, 2006

(51) Int. Cl.
*A01K 85/18* (2006.01)
*A01K 85/16* (2006.01)
*A01K 85/02* (2006.01)
*A01K 85/00* (2006.01)

(52) U.S. Cl.
CPC ............... *A01K 85/16* (2013.01); *A01K 85/00* (2013.01); *A01K 85/02* (2013.01); *A01K 85/18* (2013.01)

(58) Field of Classification Search
USPC .............. 43/42.09, 42.24, 42.26, 42.29
See application file for complete search history.

(56) References Cited

U.S. PATENT DOCUMENTS

| | | | |
|---|---|---|---|
| 588,729 A | 8/1897 | Harris | |
| 1,109,439 A * | 9/1914 | Maus | 43/42.15 |
| 1,499,819 A * | 7/1924 | Goble | 43/42.15 |
| 1,553,933 A | 9/1925 | Dills | |
| 1,786,568 A * | 12/1930 | Kutz | 43/42.1 |
| 1,816,725 A * | 7/1931 | Freeman | 43/41 |
| 2,183,816 A * | 12/1939 | Lovelace | 43/42.08 |
| 2,254,949 A * | 9/1941 | Messacar | 43/42.05 |
| 2,625,767 A * | 1/1953 | Pokras | 43/42.05 |
| 3,218,750 A * | 11/1965 | Lewin | 43/42.28 |
| 429,066 A * | 2/1969 | McClellan | |
| 3,685,197 A * | 8/1972 | McClellan | 43/42.24 |
| 3,942,280 A * | 3/1976 | Ryder et al. | 43/42.15 |
| 3,967,406 A | 7/1976 | Anderson | |
| 3,979,853 A * | 9/1976 | Storm et al. | 43/42.29 |
| 4,044,492 A | 8/1977 | Ingram | |
| 4,654,995 A | 4/1987 | Rapelje | |
| 4,777,758 A | 10/1988 | Phillips | |
| 4,807,387 A | 2/1989 | Dougherty, Jr. et al. | |
| 5,182,875 A * | 2/1993 | Righetti | 43/42.24 |
| 5,193,299 A | 3/1993 | Correll et al. | |
| 5,301,453 A | 4/1994 | Terrill | |
| 5,331,762 A | 7/1994 | Banks | |
| 5,381,620 A | 1/1995 | Gibbs | |
| 5,491,927 A | 2/1996 | Ortiz | |
| 5,522,170 A * | 6/1996 | Cole | 43/42.11 |
| 5,815,978 A | 10/1998 | Huddleston | |
| 5,946,848 A | 9/1999 | Ysteboe et al. | |
| 6,122,856 A | 9/2000 | Hnizdor | |
| 6,158,161 A | 12/2000 | Rossman | |
| 6,164,006 A | 12/2000 | Peterson | |
| 6,182,391 B1 | 2/2001 | Hubbard | |
| 6,192,618 B1 * | 2/2001 | Wackerman | 43/42.31 |

(Continued)

FOREIGN PATENT DOCUMENTS

WO  WO 03/069988  *  8/2003

*Primary Examiner* — David Parsley
(74) *Attorney, Agent, or Firm* — Innovation Law Group, Ltd.; Jacques M. Dulin, Esq

(57) ABSTRACT

A fishing lure. The lure has a tail segment which is coupled to a forebody segment. The tail segment can quickly attach and detach from the forebody segment. A flexible reinforcing membrane with an open cell structure runs along the backbone axis of the tail segment. The tail segment is made of a soft body material such as a lure plastisol. The flexible reinforcing membrane acts as a bridge securing the plastisol to a terminal at the forward portion of the tail segment which interoperates as either the male or female section of the couple with the forebody male or female segment section.

19 Claims, 7 Drawing Sheets

(56) References Cited

U.S. PATENT DOCUMENTS

| | | | |
|---|---|---|---|
| 6,212,818 B1 * | 4/2001 | Huddleston | 43/42.37 |
| 6,460,286 B1 | 10/2002 | Wilson | |
| 6,581,320 B1 | 6/2003 | Hnizdor | |
| 6,662,487 B2 | 12/2003 | Perrone, Jr. | |
| 6,775,945 B2 | 8/2004 | Gibbs et al. | |
| 6,857,220 B2 | 2/2005 | King | |
| 6,871,442 B2 | 3/2005 | Wyatt | |
| 6,912,808 B1 * | 7/2005 | Mak | 43/42.28 |
| 7,080,476 B2 | 7/2006 | King | |
| 7,107,719 B1 * | 9/2006 | Scott | 43/42.09 |
| 7,114,284 B2 * | 10/2006 | Kato | 43/42.15 |
| 7,322,151 B2 | 1/2008 | Guigo et al. | |
| 7,627,979 B2 | 12/2009 | Huddleston | |
| 2006/0260176 A1 * | 11/2006 | Yeung | 43/42.15 |

\* cited by examiner

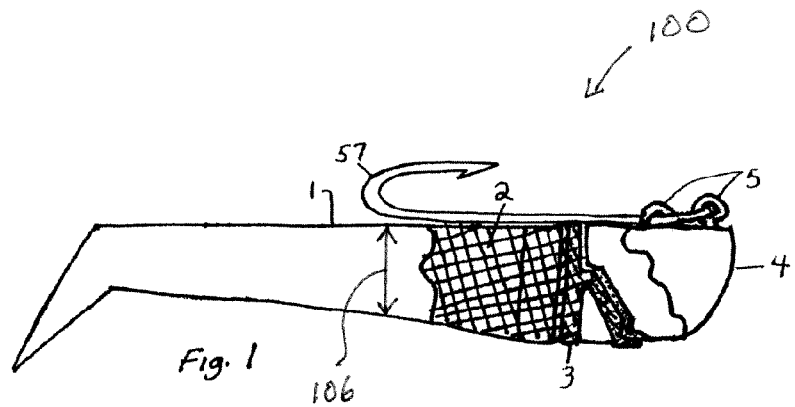
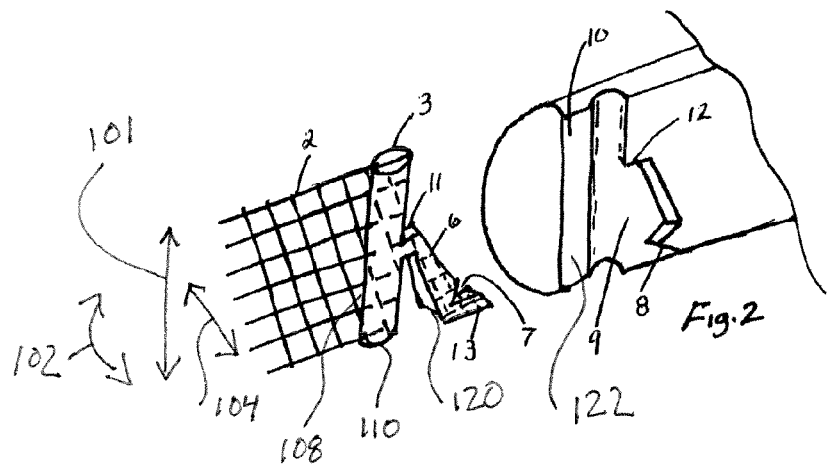
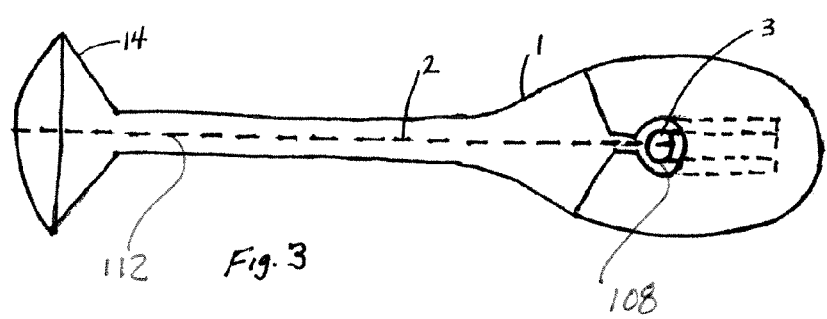

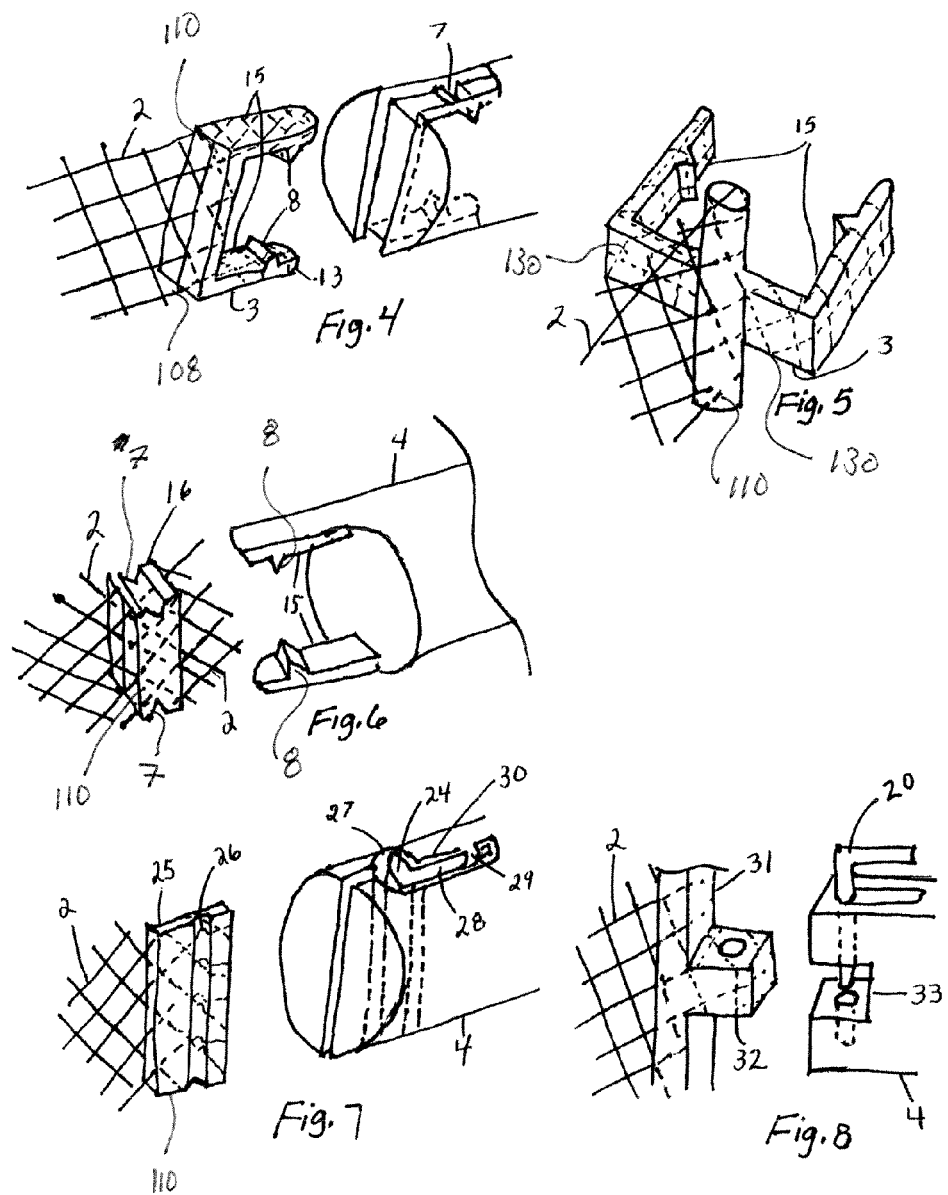

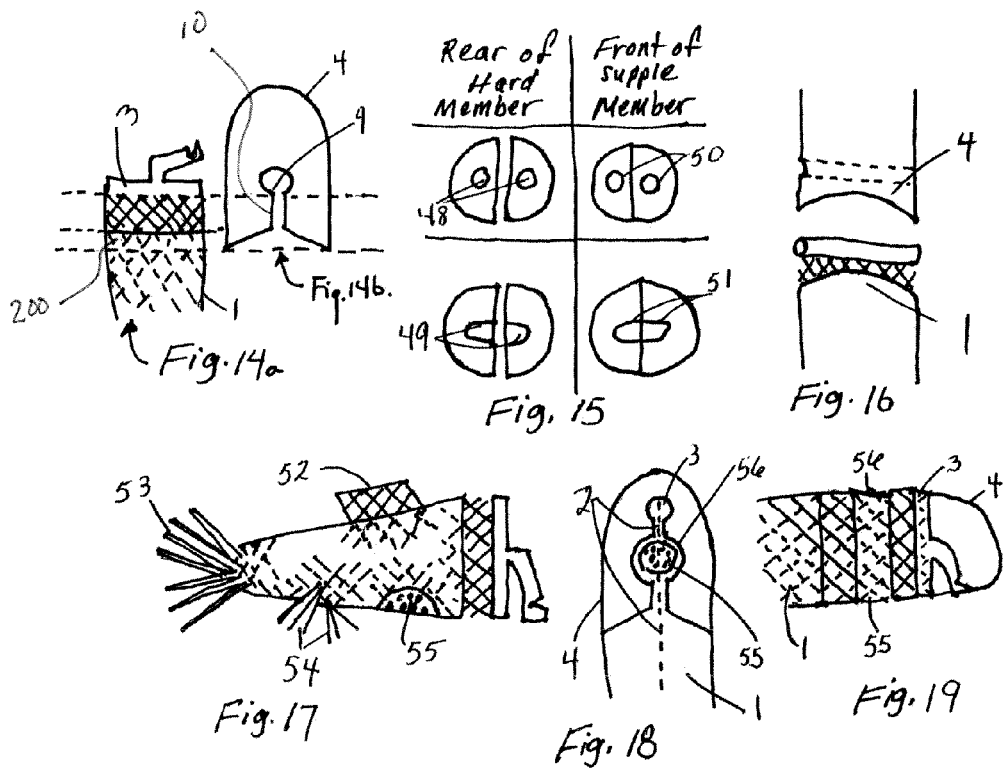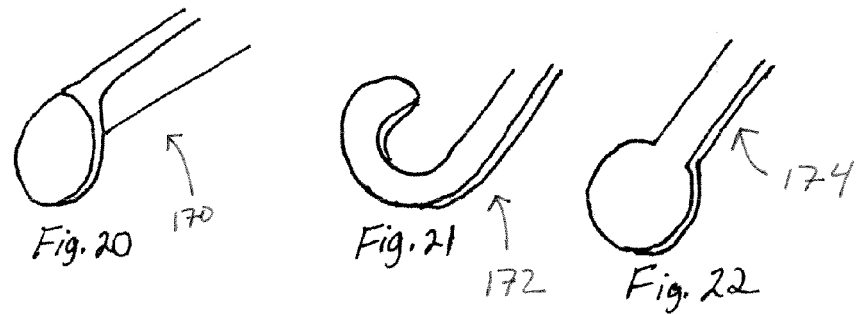

QUICK-DISCONNECT SOFT BAIT FISHING LURE

RELATED APPLICATIONS

This application claims priority benefit of U.S. Ser. No. 60/674,152 filed Apr. 21, 2005.

BRIEF DESCRIPTION OF THE DRAWINGS

FIG. 1 is a side view of the preferred embodiment of the lure;

FIG. 2 is a broken out section view of the connection between the flexible and rigid ends of the lure;

FIG. 3 is a top, full section view from the top of the lure;

FIG. 4 is a broken out section view of a connecting mechanism;

FIG. 5 is a broken out section view of a connecting mechanism;

FIG. 6 is a broken out section view of a connecting mechanism;

FIG. 7 is a broken out section view of a vertical cam connecting mechanism;

FIG. 8 is a broken out section view of a horizontal slot connecting mechanism;

FIG. 14A is a side view of a connecting mechanism joining the supple to the rigid parts;

FIG. 14B is a corresponding top view to FIG. 14A of the receiver in the hard forebody/head section;

FIG. 15 is a diagram of how the connecting mechanisms maintain vertical alignment between the soft and rigid parts;

FIG. 16 is a side view of the two concave/convex parts;

FIG. 17 is a side view of the mesh being used for reinforcement;

FIG. 18 is a top, section view of a chamber scent-absorbing material attached to the mesh of the lure;

FIG. 19 is a side view of the scent-absorbing chamber located between the supple and rigid parts of the lure;

FIG. 20 is an isometric view of one possible shape for producing action in the supple material as it moves through the water;

FIG. 21 is an isometric view of another possible shape for producing action in the supple material as it moves through the water;

FIG. 22 is an isometric view of a third possible shape for producing action in the supple material as it moves through the water;

DESCRIPTION OF THE EMBODIMENTS

Figure 9:
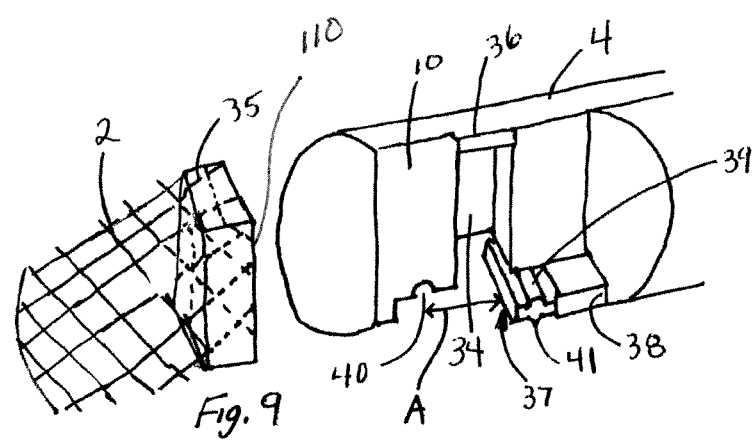
FIG. 9 is a broken out section view of a slide connecting mechanism.

The present embodiment is a fishing lure 100 which has two parts. Referring to FIGS. 1-3, the two-part lure has a rigid head or forebody segment 4 and a free moving or supple body or tail segment 1. Generally speaking, the tail segment 1 allows the fishing lure 100 to have lifelike side to side action as well as to couple to and disconnect from the head segment 4. The tail member 1, as seen in FIG. 1, is molded about a flexible reinforcing mesh 2, and the tail segment can connect to the hard member for using a couple 3 or quick disconnect connector 3. The hard member 4 supports eyelets 5 for attaching fishing line and/or hooks 57.

Still referring to FIGS. 1-3, the mesh 2 is formed of a flexible, strong reinforcing mesh such as Marquisett weave mosquito netting or a plastic polymer type material such as nylon, polyester or fiberglass. The reinforcing mesh 2 is provided with a width of one or two thicknesses depending on the desired transverse axis 104 axial strength and is provided in a vertical height 106 which provides the desired rigidity within the vertical plane 101. With such a thin width to large depth ratio, the supple tail body member 1 can move in a side to side direction 102 within the transverse axial plane mimicking the swimming action of small fish.

The forward portion 108 of the reinforcing mesh 2 is embedded in a vertically aligned terminal 110. This vertically aligned terminal in the present embodiment is arranged as a semicircular cylinder and forms one portion of the quick disconnect connector 3 or couple 3. The reinforcing mesh 2 is aligned along what would generally be the backbone of the fish. This centrally aligned backbone axis 112 extends from the center point of the forward terminal 110 to the rearwardly positioned paddle tail 14. In the current embodiment, the reinforcing mesh 2 is disposed the full vertical height 106 along the full centrally aligned backbone axis length 112 of the tail segment. In alternative embodiments, this reinforcing mesh 2, as seen for example in FIGS. 17, 27, and 28 may extend out beyond the outer surface of the tail segment 1. As seen in FIG. 17, the extensions may include shapes of, for example, dorsal fins 52, a caudal fin 53, an anal fin 54a, or may be provided as connection point locations for pelvic fins, gills, hooks and/or other ornamental effects to attract the targeted fish.

The reinforcing mesh 2 forms a bridge of sorts between the supple member 1 and at least a part of a quick disconnect mechanism 3 or couple 3 which in this particular embodiment may be the terminal 110. In other words, a portion of the flexible mesh 2 may extend beyond the forward portion of the supple body, as seen for example in FIG. 14A where the extension portion 200 allows for greater range of pivoting motion about the vertical axis along the throat portion 10, as seen in FIGS. 2 and 14B. Overall, the couple or quick disconnect mechanism 3 permits easy replacement of supple members 1 which may be lost or damaged during fishing or storage. The connector 3 also allows a fisherman to change the color, size, shape or range of flexibility of the supple member 1 while still retaining the use of the forebody segment 4. By varying the color, size, shape, and relative flexibility of the supple member 1, a wide range of different presentations for varying conditions or species of fish are produced. In addition, the supple member 1 and hard member 4 are constructed so that a variety of types and sizes of, as previously mentioned, supple members 1 can be used interchangeably with a variety of different types and sizes of hard members 4. Additionally, because of the built-in release mechanism or connector 3, the supple body member 1 can be disconnected or attached to the forebody segment 4 without the use of special tools.

Referring back to FIGS. 1-3, the terminal 110, as previously mentioned, is embedded around the forward portion 108 of the reinforcing mesh 2. The terminal 110 is constructed of a hard plastic material or elastomer such as hard polyvinyl chloride material which when connected to the fore body segment or hard member 4 provides somewhat of a rigid connection or rigid couple. In the present embodiment, the terminal 110, as seen in FIG. 2, can engage with a vertically aligned receiver 9 or a groove portion which has been constructed into the hard body or forebody segment 4 of the lure 100 (FIG. 1).

In an embodiment as seen generally in FIGS. 1-3, 4, 6-8, and 14, of the supple member 1, reinforcing mesh 2, connector 3, and receiver portion 9, are all positioned as previously mentioned in the same vertical plane 100 of the fish backbone axis 112. The connector in one embodiment, consists of a vertically aligned shaft terminal 110 (as previously mentioned) with a flexible or yielding locking arm or appendage 6. When the male portion 120 of the couple 3 or connector 3 which in this present embodiment is made of the cylindrical terminal 110 and the flexible appendage 6, is pushed through the female portion 122 (which in this present embodiment is the vertically aligned throat 10), the vertically aligned receiver 9, and the projecting ridge 8, the flexible appendage 6 compresses its female notch 7 into the male ridge 8 formed in the vertical receiver 9 of the female portion 122. The flexible appendage 6 includes a bottom tab 13 which is used to compress the flexible appendage 6 and release the couple so that the male portion 120 of the connector 3 may be removed from the fore body segment 4 and the female portion 122. In this current embodiment, the connector 3 is made of a hard but flexible plastic material as previously mentioned such as a polypropylene, polyethylene, or polyvinyl chloride.

Discussing in more detail the connector 3 (referring still to FIG. 2), the connector 3 is molded around the forward end of the reinforcing mesh 2. The Q-D connector 3 in the preferred embodiment has a flexible appendage 6 with a notch 7 for engaging and locking into a ridge 8 on the forward end of a vertical receiver 9, which is formed inside the hard member 4 (best seen in FIG. 1). The vertical receiver narrows to a throat 10 at its rearward surfaces for the reinforcing mesh to pass through as the Q-D connector is inserted from the bottom. The flexible appendage has a flat surface 11 at the top. When the Q-D connector 3 is inserted into the receiver, it stops vertical travel when the flat surface contacts a stop 12 on the vertical receiver. Q-D connector 3 has a tab 13 at the bottom which may be pushed rearward to unlock the notch in the flexible arm from the ridge on the receiver.

Still referring to FIGS. 1-3, the soft body portion material of the supple body or tail segment 1 is constructed of what is commonly referred to in the art as a plastisol. The plastisol comes in a clear format and may be mixed with dyes or other type of ornamental effects such as glitter to embed within the body of the lure 100 various eye-catching effects which mimic the lifelike attributes of fish. In addition to plastisol, the soft body portion or tail segment 1 may be constructed of a silicone base material or other type material which is usually used to cast molds for modeling the desired flexibility. One type of material may also include a rubber compound of some sort either natural or synthetic depending on the construction capabilities of the manufacturer.

During construction, and prior to casting the reinforcing mesh into the soft body or tail segment 1 of the lure 100 an ink or an adhesive is applied to the mesh 2 or fabric as a primer so that a stronger bond is achieved with the softer body plastisol construction. The inks can include screen printing inks, textile inks, including PVC based and acrylic based inks. Adhesives such as superglue (cyano acrylic) also bond well to the plastisol and mesh or material such as foil.

In addition to the beneficial characteristics of the bonding of the lure plastisol to the mesh material, the screen print plastisol or ink provides the opportunity to embed different ornamental effects within the tail section or segment 1 of the lure. Basic colors which will be used with the screen print plastisol include foil silver or holographs, glitters, puffs, and puffed glitters depending on the desired effect.

The construction process of a typical tail segment portion 1 of the lure 100 includes taking a portion of the reinforcing fabric 2 and installing shapes, casting the forward end portion 108 in the male portion 120 and especially the terminal end 110 of the connector 3, as seen in FIGS. 1-3, then arranging the reinforcing mesh with the terminal at the forward end of the tail segment 1 and casting the lure plastisol about the reinforcing mesh 2. Finally, after casting is complete, trimming the exposed reinforcing mesh as desired. Because the reinforcing mesh 2 has somewhat of an open cell structure or open weave structure, the lure plastisol in its liquid form will flow through the open weave or cell structure of the reinforcing mesh 2 and bond through the mesh creating a substantially solid body construction with the reinforcing mesh 2 cast in place. After the forebody segment 4 has been constructed, the two portions of the lure 100 can be connected utilizing the couple mechanism 3.

Although the preferred embodiment of the lure 100 construction involves a couple with a male portion 120, as seen in FIG. 2, which is a single piece mating with a female portion 122 and the forebody segment 4, a variety of other couple configurations are conceived. For example, other embodiments of the couple mechanism 3 may include movable pins, cams, clamps permanently attached to the hard member 4, and connectable to elements at the forward portion 108 of the mesh 2. Cams or clamps with nonskid surfaces may be used to connect to the bare mesh 2. Spring operated hooks permanently attached to the hard member 4 may be used to grab onto the bare mesh 2 or other elements secured to the mesh 2. The following embodiments are representative of some of the alternative embodiments of the coupling 3, the mesh 2, and the tail segment 1.

Referring to FIG. 3, a top view of one embodiment of the lure, showing the supply body 1 and Q-D connector 3 formed around the reinforcing mesh 2 in the vertical plane of the lure. A very large action-producing paddle tail 14 and a thin supple body is designed with this embodiment.

Referring to FIGS. 4-6, multiple embodiments of a one-piece external connector are provided. The molding or terminal 110 and at least some part of the quick disconnect connector or couple 3 secure the flexible mesh at the forward portion 108. Referring specifically to FIG. 4, two flexible arms 15 are arranged within the vertical plane: one at the upper portion of the terminal 110 and the other at the lower portion of the terminal. Each flexible arm 15 has a sloped ridge 8 on the inward facing surface for engagement into a notch 7 located on the external surface of the hard member 4. Each flexible arm 15 has a tab 13 at the forwardmost portion of the flexible arm which a user can lift to disengage the coupled parts. The end or rearward end of the hard member 4 is arranged or formed so that when the flexible arms 15 are seated into the female notch 7, an even/smooth surface transition is provided on the outside of the lure 100. Providing the smooth surface lessens the chance that fish, fishing line, debris or obstruction will accidentally engage the couple 3.

Referring to FIG. 5, a similar connector or couple 3, as previously discussed in FIG. 4, is shown except that the flexible arms 15 are located at a medial horizontal position. The terminal 110 has the same semi-cylindrical vertically aligned cylinder but also has two transversely protruding horizontally aligned support arms 130 which act as cantilevers for securing the horizontally longitudinally aligned flexible arms 15 in the desired extension position.

Using the same concept, in an alternative embodiment (not specifically shown but readily perceived), and still referring to FIGS. 4 and 5, the arms can be rotated 180° about their respective axis so that the male ridges 8 extend outwards and pass into openings in the shell of the hard member 4 to lock in the connector. The user would then push the ridges downwards or inward.

Referring to FIG. 6, the flexible arms 15 in lieu of being attached to the terminal 110 extend longitudinally rearward from the hard member 4 and in this particular embodiment are aligned in a vertical plane similar to the embodiment in FIG. 4. The terminal 110 or in this particular embodiment, the nonmovable vertical member 16, is secured to the mesh 2 and has at both the upper portion and the lower portion of the nonmovable vertical member 16 the female notch 7 for receiving the male ridge 8. In this particular embodiment, the nonmovable vertical member 16 is a substantially rectilinear shape but in an alternative embodiment, the plan cross-section of the vertical member 16 can be a T-shaped member to provide for a larger surface area of the female notch 7 to receive the male ridge 8 of the flexible arms 15.

In an alternative embodiment, the flexible arms extending from the hard member 4 are arranged in their horizontal position similar to the arrangement as seen in FIG. 5, and the terminal or vertical member 16 has transversely aligned support arms 130 which extend transversely to receive the male ridge 8 on the flexible arms 15 with female notches 7 at the outwards most end portions of the transversely aligned support arms 130. Referring still to FIG. 6, the reinforcing mesh 2 is positioned through the terminal 110 forward of the vertical member 16 and is surrounded by the supple material 1 (not shown) so that the supple body 1 is located between the terminal 110 and the hard member 4.

Referring now to FIG. 7, an alternative embodiment using a cam 24 as a quick disconnect connector or couple 3 is provided. The mesh 2 is embedded in the hard vertical rib member 25 or the terminal 110 and has a long vertical groove 26 to receive the cam 24. The rib 25 can be inserted into the receiver 27 of the hard body member 4 and the cam 24 pivotally engages the groove 26 locking the supple member 1 into alignment with the hard body member 4. The cam 24 has an operator arm 28 which is held in a locked position by a latch 29. The hard member 4 has a groove 30 which permits the arm to flex and which provides a recess for the arm to fit into so that the vertical member 25 is not exposed or does not extend vertically outward past the surface of the hard member 4.

The receiver cam 24 also utilizes a simple stop which is not shown, so that the cam 24 will not detach easily from the hard member 4. This particular embodiment has a hard rib 25 which is attached to the mesh 2 but in the alternative, a similar suitable connection can be made with only the mesh 2 and where no rib or terminal is utilized. Nonskid surfaces on the cam 24 and mating surfaces on the receiver 27 such as grooves or hurlings lock the inserted mesh 2 into place.

Referring to FIG. 8, a horizontal slot and latch pin connector assembly is provided where a hard vertical rib member 31 has a horizontally aligned, longitudinally forward protruding tab 32 where the vertical rib member 31 and a tab 32 are formed about the mesh 2. Tab 32 is insertable into a horizontal slot 33 in the hard member 4. The tab is held in place inside the hard hard/forebody member with a vertically aligned sliding pin 20. The tab 32 does not need to be only in the vertical plane; it can be extended horizontally, e.g. to form a T-shape. The tab 32 also can be extended vertically and used in a vertical slot position (not shown) with holding features in a horizontal position, that is, the pin latching mechanism can come in from the side instead of from the top.

Referring to FIG. 9, a slide lock 37 is horizontally aligned at the bottom of the hard member 4 and extends longitudinally rearward out of a channel 38 to engage a groove 40 positioned on the outside surface of the hard member 4. The hard member has a vertical receiver 34 for receiving a terminal 110 or connector 35, formed around the mesh 2. The connector post 35 is formed to conform to the shape of the vertical receiver 34 and hard member 4. The distance between the rearward end of the connecting mechanism and the supple body is roughly equivalent to the longitudinal distance of the throat 10 of the hard member 4. The vertical receiver 34 has a stop 36 at one end to limit the upward vertical travel of the connecting post.

The flexible slide 37 as previously discussed is seated inside a channel 38 and located within the hard member 4. The flexible locking slide 37 has an inward facing ridge 39 running along its transverse width for engaging and locking it into the previously mentioned groove 40 on the outside surface of the hard member. A second ridge or groove 41 on the outside surface of the locking slide 37 is provided for operating the longitudinal sliding of the lock back and forth in and out of the channel 38. Hooks may be placed on the opposing side or surface of the slot so that the hook does not interfere with the coupling mechanism 3.

Figure 10:
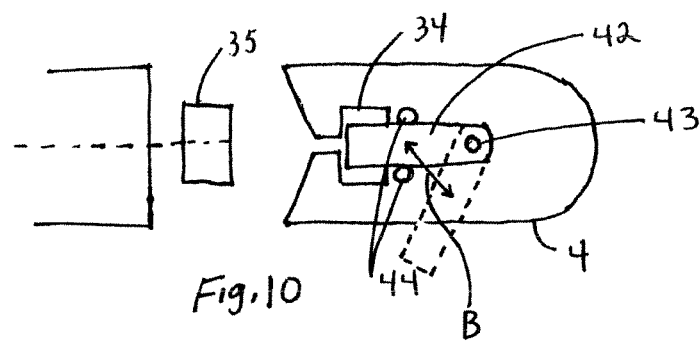
FIG. 10 is a top or bottom, full section view of a slide connecting mechanism held by a flexible tab.

Referring to FIG. 10, a design similar to the embodiment as seen in FIG. 9 is shown except that the slide arm or latch 42 is secured about a pivotable origin point for holding a connecting post 35 inside a vertical receiver 34 in the hard member 4. The arm is attached to the hard member by a pin or rivet 43 and is allowed to pivot from side to side in a plane perpendicular to the vertical plane of the post and hard member. Knobs or bumps 44 on the outside surface of the hard member keep the arm in a closed position. Like the design in FIG. 9, the hard member has a stop at the end opposite the opening in the vertical receiver.

Figure 11:
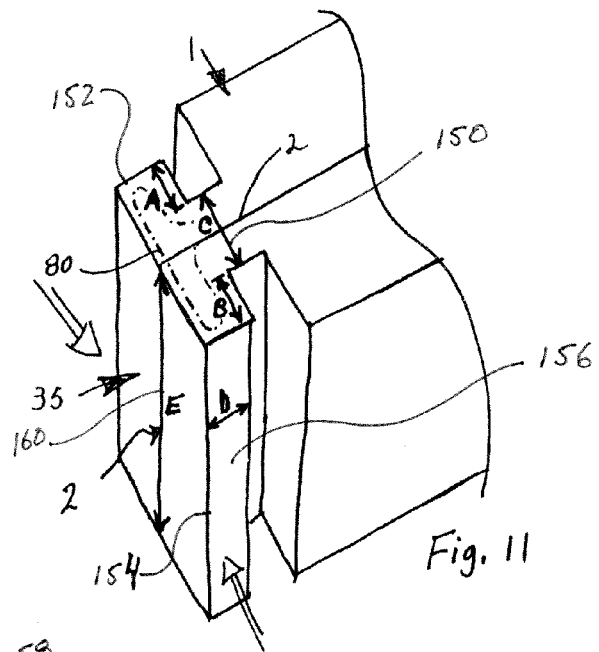
FIG. 11 is a close up, perspective view of a vertical post used to slide into a rigid receiver.
Figure 12:
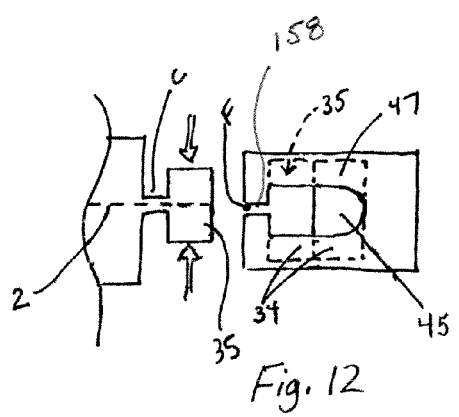
FIG. 12 is a top, section view of a connecting mechanism using a soft, compressible post fitted into a rigid slot.

Referring to FIGS. 11 and 12, a T-shaped connector 35 comprises a stem 150 that forms a bridge between the supple flanges 152 and 154 and the supple body 1. The transverse flanges 152 and 154 on either side of the stem 150 serve to retain the body 1 against the rearward surface of the vertical receiver 34. The flange width 156 of the flanges along the longitudinal plane provides enough section strength to keep the flanges 152 and 154 from being easily removed through the throat 158 from their seated position in the vertical receiver 34. The height 160 of the T-shaped connector matches the throat height 158. The mesh 2 acts as a reinforcement which permits the stem 150 to be small (approaching the width of the mesh). When the stem 150 is narrow, it allows for larger flanges in 152 and 154, which makes for a stronger connection. To make the connector stronger, the mesh 2 can be folded to extend into both flanges as shown by mesh fold path 80. To fit into the receiver, (as seen in FIG. 12) the T-shaped connector is compressed in the direction of the arrows.

Referring to FIG. 12 an alternative embodiment of a connection is made by compressing (in the direction of the arrows) or flexing a supple T-shaped connector 35 into a vertical receiver 34 that has an opening 45 with a shape different from, or oriented differently than the post. Throat 158 is slightly narrower than stem 150 of connector 3 to provide a good, frictional fit. The shape of space 45 provides room for flexible post 35 to be squeezed or otherwise contorted to fit into received space 45 so that once it has passed through the opening, the post returns to its original shape, which locks the post into the receiver 34. The width of the receiver 34 is wider than opening 45 so that after flanges 152 and 154 of connector 35 are compressed to fit through opening 45, they are then permitted to expand to fill the width of receiver 34, leaving a void 47 at the forward end of the opening. The T-shape connector 35 fits tightly inside the receiver 34, which makes it less likely for the supple post to slide out of the opening.

Figure 13:
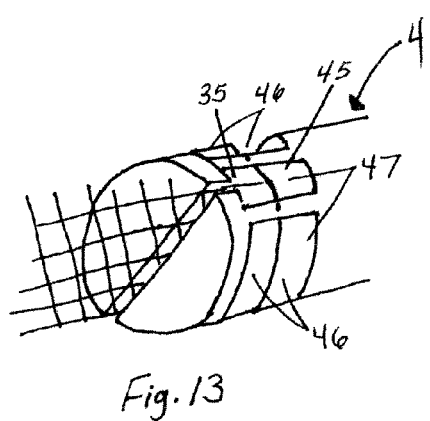
FIG. 13 is a broken out section view of side slots used to recompress the compressed post to disengage it from the slot.

Referring now to FIG. 13, a vertical post 35 has been passed through an opening 45 with a shape oriented different from the post and returned to its original shape, thus the post is difficult to remove without a way to re-compress or flex the flanges 152 and 154 through the opening from the outside. This removal is achieved by placing windows 46 on the outside surface of the hard member's vertical receiver. To remove the soft body, finger pressure is applied to the sides of the post through the windows to flex, compress, and guide the soft body back out through the opening. In this embodiment, the post is shaped more like a disc to confirm to the outside surface of the hard member 4. The void 47 in the receiver allows room for manipulating the post through the opening. In cases where the post and the supple body are separated, the post (or disc in this case) can be pushed out through one of the windows 46. While this embodiment has rectangular posts and openings, a variety of shapes can be used, depending on factors such as thickness and hardness of the post.

Referring to FIGS. 14a and 14b, the supple body 1 is compressed against the rear of the hard member 4 for a tight connection. The forward end of the soft body is flat, and the distance between it and the rear of the connection mechanism 3 is less than the distance between the rear of the vertical receiver 9 and the rearward end of the hard member 4. The rearward end of the hard member is V-shaped. When the supple body and hard member are connected, the forward end of the supple body is compressed into the V of the hard member.

Referring to FIG. 15, the vertical alignment between the supple body and hard member is maintained by sockets and grooves. Even though the tight compression helps keep the two lure parts aligned, slight vertical drift can occur, especially after battles with fish weaken the compression. In this embodiment, the rear surface of the hard member is shaped with sockets 48 or grooves 49 that are mated with balls 50 or tongues 51 molded on the forward surface of the supple body.

Referring to FIG. 16 the maintenance of vertical alignment between the supple body and hard member is accomplished by forming the entire forward end of the supple body 1 in a concave shape and the rearward end of the hard member 4 in a convex shape.

Referring to FIG. 17 the reinforcing mesh may be used for other features in the fishing lure 100. Portions of the mesh may be left un-molded on the exterior of the supply body to simulate fish fins. This embodiment has a dorsal fin 52, but the mesh can be configured for any single fins such as caudal or anal fins. Elements may be glued or otherwise firmly attached to the mesh, located exterior of the supple body, to simulate features such as fins or gills. Tinsel, hair, feathers, or other suitable materials can be used. A caudal fin 53 shown in the current embodiment is glued to the mesh in the vertical plane. This attachment means it can also be used to simulate dorsal and anal fins. Paired fins such as pelvic fins 54 may be attached and positioned horizontal to the vertical plane of the mesh so that one of each of the paired fins is on one side of the supple body. Other paired structures such as pectoral fins or gills could be simulated with a variety of materials. A scent-absorbing material 55, such as sponge, may be attached to any part of the mesh.

Referring to FIG. 18 and FIG. 19, a scent-absorbing material 55 is attached to the mesh 2 along the vertical plane and inside a chamber 56 provided in the hard member 4. In this embodiment, the scent-absorbing chamber is located between the supple body 1 and the connecting mechanism 3, but the chamber can also be located forward of the connector, depending on the type of connector used.

Referring to FIGS. 20-22, different type of action-producing shapes used in supple bodies are provided. All of these shapes produce movement in the supple body as it moves through the water. FIG. 20 is often called a paddletail 170; FIG. 21 is a sickletail 172; and FIG. 22 may be called a flat disc tail 174.

Figure 23:
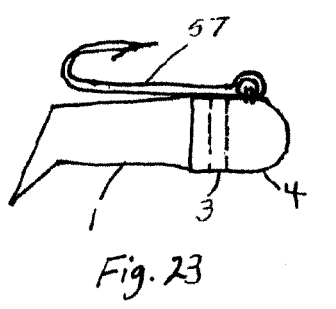
FIG. 23 is a side view of the two-part inventive lure with the connecting member located in the hard member.
Figure 24:
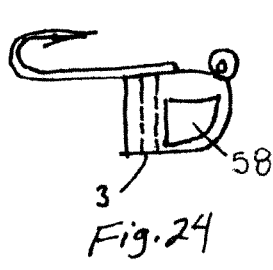
FIG. 24 is an isometric of the hard member (fore end of the lure) containing a heavy material inside and a hook outside.
Figure 25:
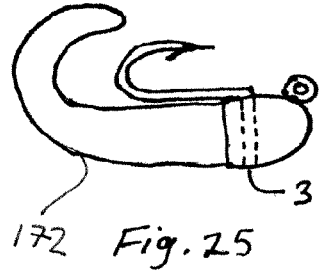
FIG. 25 is a side view of a lure with a sickletail body, with a hook through the rigid member.
Figure 26:
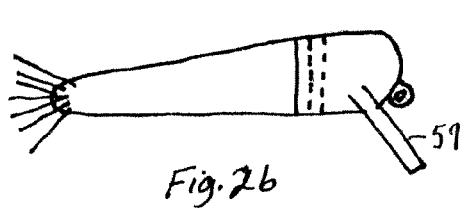
FIG. 26 is a side view showing a forward, diagonally angled, rigid action producing lip.

Referring to FIGS. 23-25, hard members 4 which can be used with action-producing supple body shapes 1 supplying most of the lure action are provided. Note that the embodiments shown include a vertical connector 3 located in the hard member 4. Referring to FIG. 23, a hard member 4 consisting of a heavy material, such as lead, and a hook 57 is provided. Without attachment features, such as a hook, inside the supply body 1, the body can be short but thin, supple and lifelike all the way to the connection with the hard member 4. Referring to FIG. 24, a heavy element 58 inside a hard member made of another material, such as hard plastic is provided. The heavy component is used to sink the lure, and is provided as an alternate material for supporting a connection mechanism and hook. Referring to FIG. 25, a sickletail body 172 is connected to a lure with neutral or positive buoyancy. As in FIG. 23, the lack of an internal hook or other connecting elements allows the whole supple sickletail to produce lifelike motion.

Figure 27:
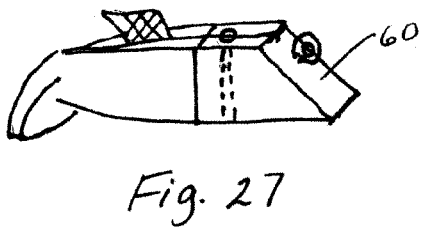
FIG. 27 is an isometric of a lipless crank bait.
Figure 28:
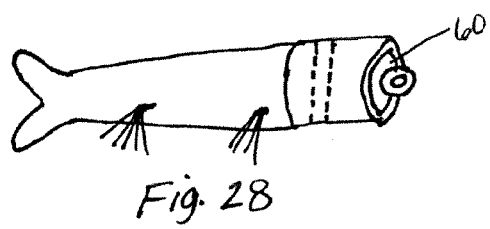
FIG. 28 is an isometric of a lure with a concave forward surface.
Figure 29:
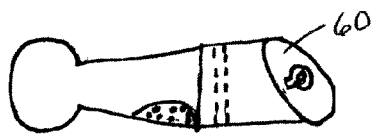
FIG. 29 is an isometric of a lure with an angled forward surface.

Referring to FIGS. 26-29, different action-producing surfaces are provided on the forward end of the hard member. Referring to FIG. 25, a lure with a hard member is provided supporting an action-producing lip 59 at its forward end. Most lures of this type have some buoyancy component and are often referred to as 'crank baits'. The hard member in FIG. 27 is often referred to as a lip-less crank bait. The forward surface 60 is flat and perpendicular to the vertical medial plane of the lure. Different angles on the flat surface may be used to produce a desired action. The hard member in FIG. 28 is basically a concave forward surface 60 that produces an erratic, darting action. FIG. 29 has a hard member with a forward surface 60 that is angled, both horizontally and vertically, from the vertical medial plane. It produces a spin similar to the action of a cut-plug herring often used for salmon fishing.

Figure 30:
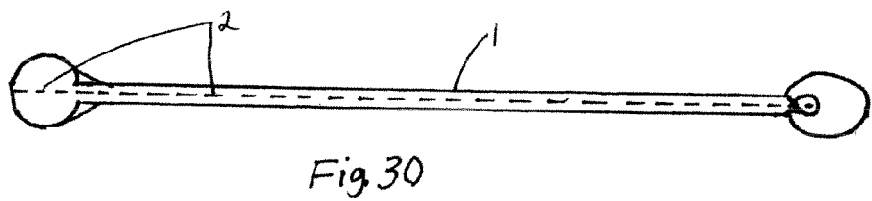
FIG. 30 is a top view of a thin, supple bodied lure.

Referring to FIG. 30, a thin supple body is provided. Lifelike action is mimicked through the internal strengthening provided by the mesh 2, allowing for a thinner, longer and softer supple body 1.

Figure 31:
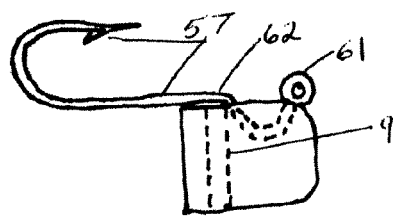
FIG. 31 is a side, sectioned view of a rigid member fitted with an embedded, bent hook attachment.

Referring to FIG. 31, a hook 57 is bent so that both the line attachment 61 and hook shank 62 exit the top of the hard member. This bent hook arrangement for the entire rearward end of the hard member 4 is to be used in making a connection to a supple body 1. The hook shank may also serve as stop for a vertical receiver 9.

Figure 32:
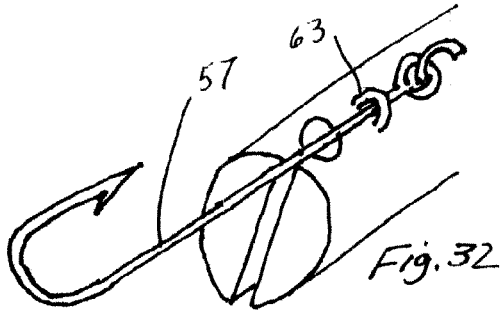
FIG. 32 is an isometric of a means of maintaining a hook to prevent interference with the soft body.

Referring to FIG. 32, a means of maintaining a hook is provided in a position where it does not interfere with the connection to or action of the soft body and stays in position for hooking a fish (parallel to the soft body). This positioning is accomplished by securing the hook 57 through a strong loop 63 perpendicular to the hook shank.

Figure 33:
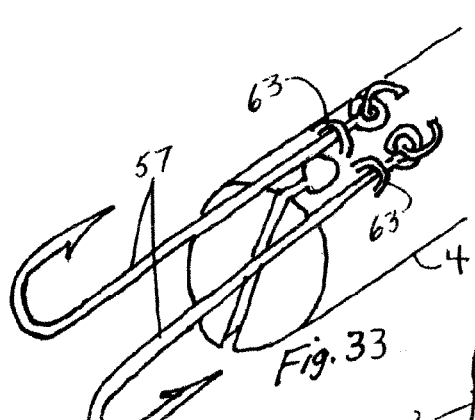
FIG. 33 is an isometric of two hooks secured through loops on the hard member.
Figure 34:
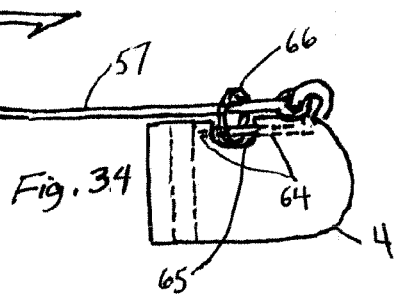
FIG. 34 is a side view of a hook connector using a wire and a rank.

Referring to FIG. 33, two or more hooks 57 are secured through loops 63 on a hard member 4 with this construction.

Referring to FIG. 24, a hook securing embodiment is provided where a wire 64 is secured under and parallel to the hook 57. A notch 65 in the hard member 4 allows the wire to run through, and the hook is secured to the wire with a split ring 66.

Figure 35:
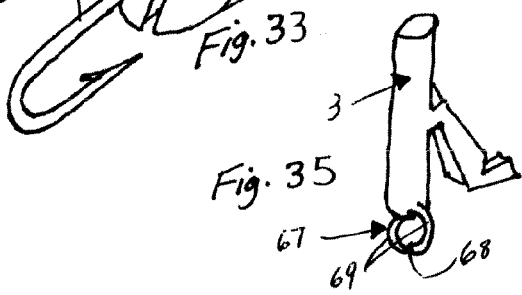
FIG. 35 is an isometric of a hook connector built into a connecting mechanism.

Referring to FIG. 35, a hook or line keeper embodiment is formed as an extension of the connecting mechanism 3. The keeper has a circle 67 made of the same flexible material as the connecting mechanism with an opening 68 at the bottom center. The opening allows a hook shank to be pushed inside the circle and secured in the proper position. The flexibility in the two arms 69 of the circle allows for the hook to be pulled free when a fish is hooked.

Figure 36:
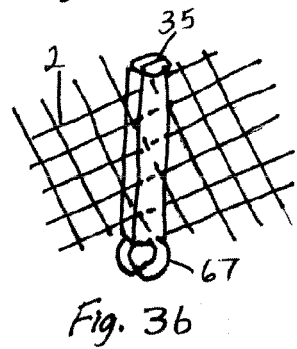
FIG. 36 is an isometric of a hook keeper molded into the connector post, over flexible mesh.

Referring to FIG. 36, a hook or line keeper embodiment similar to the embodiment in FIG. 35 is provided. This keeper consists of a post 35 made of flexible, durable material like the connecting mechanism 3, molded around the reinforcing mesh 2. As in FIG. 35, the post has a flexible, open ring 67 at the end. The post may be located on the mesh rearward of the connecting mechanism 3 and the keeper rings extend outside of the supple body (see FIG. 38).

Figure 37:
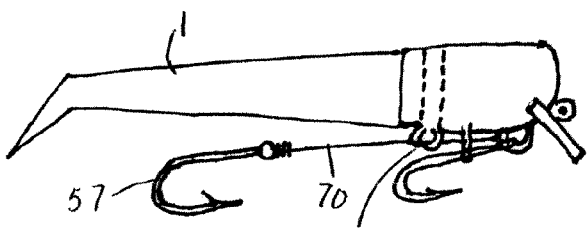
FIG. 37 is a side view of a crank bait lure with a wire loop holding a hook parallel to the supple body and can optionally include a second keeper to tether a line or orient the hook.

Referring to FIG. 37, a crank-bait type lure embodiment with a wire 70 connecting to a hook 57 is provided. The wire is held parallel to the supple body 1 by a hook keeping 71 similar to the one in FIG. 35.

Figure 38:
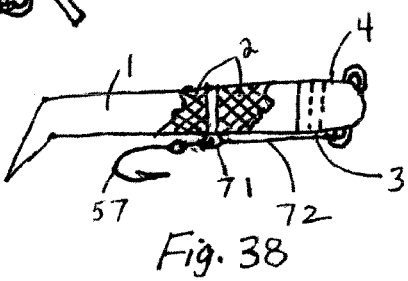
FIG. 38 is a side view of a hook keeper formed around the mesh, for orienting a hook connecting to fishing line.

Referring to FIG. 38, a hook keeper 71 like the one in FIG. 36 is provided. In this embodiment the fishing line 72 is pushed through the opening at the bottom of the circle so the hook 57, which is attached to the line, will stay in a good hooking position. Note that the keeper is formed around the mesh 2 and molded inside the supple body 1 well to the rear of the hard member 4. In this design, neither the fishing line nor the hook keeper significantly affects the flexibility of the supple body.

Therefore I claim:

1. A fishing lure having two quick-disconnect segments: a forebody segment, and a tail segment, said segments having dorsal, ventral and lateral sides, said two quick-disconnect segments lure consisting essentially of two co-operating artificial structures which in use mimick the form and lifelike swimming action of a living bait fish, comprising in a straightened orientation:
   a) a first, rigid forebody segment having a front end and a back end, and a length, along a longitudinal axis between said lateral sides, from front to back greater than a transverse width defined between said lateral sides, said forebody segment defining the front of the lure;
   b) a second, tail segment having a front end and a back end, and a length, along a longitudinal backbone axis between said lateral sides, from front to back greater than a transverse width defined between said lateral sides:
      i) said second tail segment is removably connected to said first forebody segment by a quick-disconnect assembly;
      ii) said second tail segment includes a planar flexible membrane having a first end and a second end; and
      iii) said planar membrane is oriented in a substantially vertical plane intersecting said longitudinal backbone axis of said tail segment;
   c) said tail segment consists essentially of a solid, flexible supple body polymeric material in which said membrane is embedded, said membrane providing re-enforcement to said supple body polymeric material, and said vertical orientation of said membrane permitting lifelike action during fishing;
   d) said segments of said lure not being formed as, or functioning as, a bait bag;
   e) said tail segment and said forebody segment quick-disconnect assembly consists essentially of a cooperating engaging and locking assembly having a first, terminal element and a second, receiver element to removably connect said tail segment to said forebody segment, one of each said quick-disconnect assembly elements being formed as part of respective different ones of said forebody and tail segments, and said quick-disconnect element of said tail segment is fixedly connected to the membrane adjacent its first end, so that when said tail segment is disconnected from said forebody segment, both said elements remain fixedly connected to their said respective segments; and
   f) both said quick-disconnect elements may be quickly reconnected without disassembly from their respective segments, so that when said tail segment is connected to said forebody segment, the back end of said forebody segment is in contact with the front end of said tail segment with substantially no gap between said connected segments of said lure.

2. The fishing lure of claim 1, wherein the length of said tail segment supple body is greater than said length of the forebody segment.

3. The fishing lure of claim 1, wherein said membrane is a woven polyester fabric having an open cell structure.

4. The fishing lure of claim 1, wherein a portion of said membrane between said terminal and said supple body is exposed when said tail segment is disconnected from said forebody segment.

5. The fishing lure of claim 1, wherein a portion of the membrane of said tail segment supple body is exposed beyond at least one of said dorsal and ventral sides of said tail segment, said exposed portions not being embedded in said plastic material of said supple body member, and said exposed portions being configured as one or more corresponding dorsal, caudal and anal fins.

6. The fishing lure of claim 1, wherein said fishing lure has a total length which is substantially equal to the length of the forebody segment and the tail segment, and wherein said tail segment has a length that is at least ½ of the total length of said lure.

7. The fishing lure of claim 1, wherein said membrane has a vertical height, said fishing lure has a lure height defined between its dorsal and ventral sides, and wherein said membrane vertical height totals at least ¼ of said lure height at a location where said quick-disconnect receiver element and said terminal element connect.

8. The fishing lure of claim 7, wherein said membrane height totals greater than ½ of the lure height at the location where said quick-disconnect receiver element and said terminal element connect.

9. The fishing lure of claim 1 wherein said membrane includes a primer coating, so as to create a stronger bond between said membrane and said supple body polymeric material.

10. The fishing lure of claim 1, wherein at least one of said forebody segment and said tail segment has a hook attached thereto and wherein the hook is not embedded in said segment.

11. The fishing lure of claim 10, wherein said hook is positioned on at least one of said dorsal and said ventral side of said lure.

12. The fishing lure of claim 1, wherein the membrane is embedded into the terminal element of said quick-disconnect assembly, the membrane has a thickness and the terminal has a thickness and wherein the thickness of the terminal is greater than the thickness of the membrane.

13. The fishing lure of claim 12, wherein said terminal element is formed as part of said tail segment, and said quick-disconnect assembly comprises a stem and throat locking assembly system.

14. The fishing lure of claim 12, wherein said tail segment terminal is made of a first material, said supple body of said tail segment is made of a second material, and said first material has greater rigidity than said second material.

15. The fishing lure of claim 13, wherein said tail segment terminal is made of a first material, said flexible membrane of said tail segment is made of a third material, and said first material has greater rigidity than said third material.

16. The fishing lure of claim 1, wherein the terminal lies within a plane formed by the backbone axis of the tail segment when the tail segment is in a straightened configuration.

17. The fishing lure of claim 3, wherein said tail segment includes said terminal element at its forward end, and a portion of the membrane between said terminal and said supple body is exposed when said tail segment is disconnected from said forebody segment, said exposed portion permits said terminal to be engaged in said receiver.

18. The fishing lure of claim 12, wherein said plastic of said supple body portion of said tail segment is selected from a plastisol, a silicone, a natural rubber and a synthetic rubber, and said supple body is flexible in its entirety, when said tail segment is connected to said forebody segment to provide said lifelike action.

19. The fishing lure of claim 17, wherein said membrane is embedded into said terminal.

\* \* \* \* \*